March 12, 1957 W. O. REED 2,785,220

MONOCHROME TO COLOR CONVERTER SYSTEM

Filed Nov. 10, 1951

*INVENTOR:*
WILLIAM O. REED
BY Francis W. Crotty
HIS ATTORNEY.

2,785,220
Patented Mar. 12, 1957

2,785,220

MONOCHROME TO COLOR CONVERTER SYSTEM

William O. Reed, Chicago, Ill., assignor to The Rauland Corporation, a corporation of Illinois Application November 10, 1951, Serial No. 255,869

14 Claims. (Cl. 178—5.4)

This invention relates to color television and more particularly to a novel apparatus for adapting monochrome television receivers to the reproduction of images in natural color.

Numerous systems are known for transmitting and receiving images in natural color some of which are compatible with presently accepted standards for monochrome image transmission while others are not. In general, the reproduction of images in natural color requires either a special and complex color picture tube or a spinning filter disc, rotating filter drum, or equivalent apparatus in conjunction with a conventional monochrome image-reproducing device. Such special tubes as are presently known are costly and, moreover, are not available to the general public. If a color filter arrangement is employed, black-and-white reception may be attained only by removing the filter apparatus, an expedient which is often impractical owing to the relative inflexibility of commonly employed driving mechanisms for the filter apparatus or by employing more complex filter arrangements. In any event, mechanical filter arrangements are often noisy and may require frequent adjustment.

It is an important object of the present invention to provide a novel system and apparatus for adapting an ordinary monochrome receiver to the reproduction of images in natural color.

It is a further object of the invention to provide a novel color adapter tube for converting monochrome reproductions of radiated color-video signals to natural color reproductions representative of the transmitted image.

Yet another object of the invention is to provide a new and improved system and apparatus for adapting ordinary monochrome receivers to the reproduction of images in natural color while at the same time permitting reception of ordinary monochrome transmission when desired.

Still another object of the invention is to provide an improved system and apparatus for adapting ordinary monochrome receivers to the reproduction of images in natural color without the use of mechanical contrivances such as spinning color-filter discs, rotating color-filter drums, and the like.

These and other objects of the invention are achieved by providing a color adapter tube positioned between the screen of the image-reproducing device of an ordinary monochrome receiver and the eye of the observer, together with a switching device for operating the adapter tube in color synchronism with the received composite color-video signals. The color adapter tube comprises a fluorescent screen including a plurality of interspersed similar groups of elemental target areas, the elemental areas of each group exhibiting a color-radiation response characteristic to electron bombardment which is different than that of each of the remainder of the groups. Means including a photoemissive cathode are provided for projecting towards the fluorescent screen an electron beam restricted in cross-sectional configuration and space distribution to correspond to one of the groups of elemental target areas. A deflection-control system is provided intermediate the photoemissive cathode and the fluorescent screen and is responsive to an applied color-control signal for causing transverse deflection of the electron beam from one to another of the groups of elemental areas.

The features of the present invention which are believed to be novel are set forth with particularity in the appended claims. The invention, together with further objects and advantages thereof, may best be understood, however, by reference to the following description taken in connection with the accompanying drawing, in the several figures of which like reference numerals indicate like elements, and in which:

Figure 1:
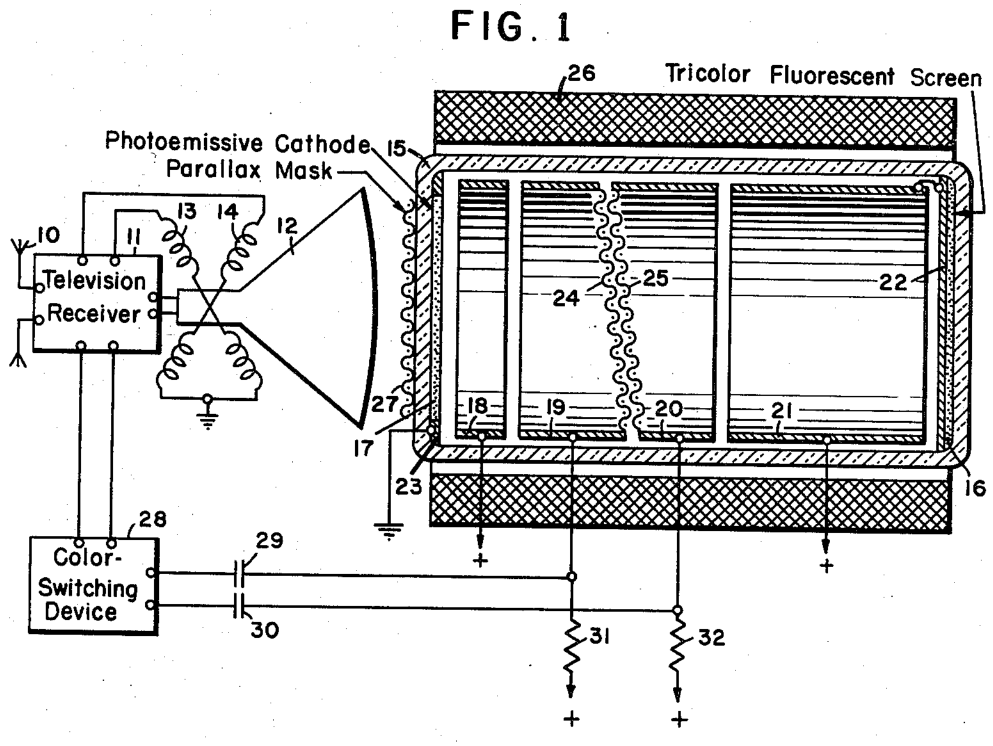
Figure 1 is a composite view, partly schematic and partly in cross-section, of an embodiment of the present invention.

In the arrangement of Figure 1, composite color-video signals including video-signal components, scansion-synchronizing components, and color-synchronizing components, are intercepted by an antenna 10 and impressed on the input circuits of an ordinary monochrome television receiver 11 which is operatively associated with a conventional monochrome image-reproducing device 12 and associated deflection coils 13 and 14. Of course, the scanning circuits of television receiver 11 must be appropriate with respect to the nature of the received composite color-video signals; in other words, it may be necessary to include alternative scanning systems in the event that incompatible transmission systems, such as the field-sequential system presently adopted as standard by the Federal Communications Commission, are employed. On the other hand, if the color transmission is effected by means of a compatible system, such as the dot-sequential system, no modification of the ordinary monochrome television receiver is required in this respect.

In accordance with the invention, a color adapter tube 15 is placed in juxtaposition with the monochrome image-reproducing device 12. Color adapter tube 15 comprises a multicolor fluorescent screen 16, a photoemissive cathode 17, and a plurality of accelerating electrodes 18, 19, 20 and 21 arranged within a common evacuated envelope. Fluorescent screen 16 is constructed of a plurality of interspersed similar groups of similar elemental target areas, the elemental areas of each of the groups exhibiting a different color-radiation response characteristic to electron bombardment than that of each of the remainder of the groups. Preferably, fluorescent screen 16 is formed as a tricolor screen employing three different phosphors each exhibiting a peak response to electron bombardment in one of three primary colors red, blue and green. While numerous phosphor materials for providing the desired spectral response for each of the three primary colors are well known in the art, a screen having the desired properties may be provided by employing manganese-activated zinc silicate as the green phosphor, titanium-activated calcium-magnesium silicate as the blue phosphor, and manganese-activated cadmium borate as the red phosphor. The elemental areas of each group may be formed as line elements extending the full width or height of the tube face, as dot elements arranged in regularly disposed triads, or in any other suitable manner. An electron-permeable metal backing layer 22, constructed as an aluminum film for example, is preferably provided behind fluorescent screen 16 for increased brightness.

In the embodiment of Figure 1, photoemissive cathode 17 is of the continuous variety and is provided with a conductive contact ring 23 which is connected to a suitable point of reference potential such as ground. Photoemissive cathode 17 may be constructed of any material exhibiting a relatively uniform emission response characteristic throughout the visible spectrum, composite photosurfaces such as antimony-caesium (Sb—$Cs_3$) or silver-caesium oxide-caesium (Ag—O—Cs) being preferred.

Accelerating electrodes 18, 19, 20 and 21 may be constructed and supported in accordance with well-knwn image-converter techniques and are operated at suitably graduated constant positive potentials with respect to grounded photoemissive cathode 17. Electrodes 19 and 20, however, are complementally angularly truncated to form a deflection-control system intermediate photoemissive cathode 17 and fluorescent screen 16. In order to avoid undesirable lens effects, it may be advantageous to provide fine mesh coverings 24 and 25 for the complemental angular truncations of electrodes 19 and 20. With this arrangement, whenever electrodes 19 and 20 are operated at different positive unidirectional potentials, a transverse electrostatic field component is produced, with the result that the transverse deflection of the electron beam originating at photoemissive cathode 17 may be controlled by varying the potential difference between electrodes 19 and 20.

Color adapter tube 15 may be surrounded by a long focusing solenoid 26 energized from a variable potentiometer (not shown) associated with the direct-voltage supply of the receiving apparatus, although it may be possible to supplant solenoid 26 by judicious design and operation of the adapter tube. Moreover, a parallax mask 27 is disposed between the monochrome image-reproducing device 12 and the deflection-control system comprising electrodes 19 and 20. Parallax mask 27 is provided with a plurality of apertures similar in configuration and space distribution to one of the groups of elemental areas of fluorescent screen 16 and may, for example, be constructed of etched photosensitive glass, or as a metal grid. Mask 27 may be disposed between monochrome image-reproducing device 12 and photoemissive cathode 17 as illustrated, or alternatively between photoemissive cathode 17 and the deflection-control system comprising electrodes 19 and 20; in the first instance, parallax mask 27 blocks a portion of the light originating at monochrome device 12 from energizing photoemissive cathode 17, while in the other instance the parallax mask intercepts a portion of the electron beam originating at photoemissive cathode 17. Suitable condensing lenses (not shown) may be provided between device 12 and color adapter tube 15 and/or between tube 15 and the eye of the observer.

The color-synchronizing components of the received composite and color-video signals are impressed on a color-switching device 28 which in turn is coupled to electrodes 19 and 20 by means of coupling and blocking condensers 29 and 30, and suitable voltage-dropping resistors 31 and 32 are provided between electrodes 19 and 20 and the positive operating potential source.

In operation, black-and-white image reproductions of different color content are reproduced on the screen of monochrome image-reproducing device 12 in a repetitive color sequence at spaced intervals determined by the color-synchronizing components of the received composite color-video signals. These reproductions may be either complete image fields in the case of field-sequential transmission, or only partial fields in the case of line- or dot-sequential transmission. While the system is readily adaptable to any of these types of transmitting standards, the further operation of the system will be explained, for convenience, in terms of field-sequential transmission.

During the red field of the transmitted color image, a black-and-white image reproduction is formed on the screen of device 12, and this reproduction is representative of the red content of the transmitted image. Since photoemissive cathode 17 is exposed to the black-and-white reproduction of the red color field, an electron beam is emitted toward fluorescent screen 16. By virtue of the interposition of parallax mask 27 between device 12 and photomissive cathode 17, the red field reproduction is optically dissected, with the result that the electron beam projected toward fluorescent screen 16 is restricted in cross-section to correspond to one of the groups of elemental target areas. Moreover, the intensity of the beam is space-modulated in accordance with the shade values of the black-and-white red-field reproduction. At the same time, color switching device 28 operates to adjust the potential difference between electrodes 19 and 20 to provide exactly the proper transverse deflection field for insuring that only the red-phosphor portions of the tricolor fluorescent screen 16 are impinged upon by the space electrons originating at photoemissive cathode 17. Consequently, the monochrome red-field reproduction at the screen of device 12 is converted to a red reproduction of that field at fluorescent screen 16 of color adapter tube 15.

If the ensuing transmitted field represents the blue content of the transmitted image, the potential difference between electrodes 19 and 20 is altered to direct the electron beam to only the blue-phosphor portions of tricolor screen 16. Similarly, during green field reception, the potential difference between electrodes 19 and 20 is adjusted to insure impingement of the space electrons on only the green-phosphor portions of screen 16.

Thus it is apparent that the successive fields of the transmitted image are reproduced at the tricolor fluorescent screen 16 of color adapter tube 15 in a repetitive color sequence corresponding to that employed at the transmitter (not shown). Proper color synchronism between transmitter and receiver is insured by virtue of color-switching device 28 which is driven by the color-synchronizing components of the received composite color-video signals. For convenience, color adapter tube 15 may be so constructed and parallax mask 27 so located that one of the color fields is reproduced when electrodes 19 and 20 are operated at a common potential. With such an arrangement, a constant potential difference may be employed between electrodes 19 and 20 for the other two primary color fields, only a polarity reversal being required to effect a change from one to the other. In this manner, a simple stair-step wave generator, triggered by the color synchronizing pulses, may be employed as color-switching device 28, or a simple mechanical arrangement employing suitably constructed commutator systems may be employed. However, such an arrangement is not necessary, since the color-switching device 28 may be designed to provide any desired energizing function for electrodes 19 and 20.

It is apparent that equivalent color reproduction may be obtained for line-sequential and dot-sequential transmission since the color switching device 28 automatically insures proper registration of the primary colors in response to the color-synchronizing components of the received composite color-video signals. Moreover, either a strip-type or a dot-type fluorescent screen 16 may be employed, regardless of whether a field-sequential, line-sequential, or dot-sequential system of transmission is employed. In any event, when a single deflection-control system is provided, the interspersed color groups must be so positioned with respect to the deflection-control system that deflection in a single plane effects color-switching.

As pointed out above, the parallax mask 27 may be disposed either externally of color adapter tube 15 between monochrome image-reproducing device 12 and photoemissive cathode 17 or internally of color adapter tube 15 between photoemissive cathode 17 and the deflection-control system comprising electrodes 19 and 20. It is preferred, however, to dispose the parallax mask in the manner illustrated in Figure 1, externally of color adapter tube 15, since such an arrangement permits mechanical adjustment of the position of the parallax mask when the system is installed, thereby eliminating the necessity for precision location of the parallax mask within the evacuated envelope. Moreover, such an arrangement avoids the necessity for an additional internal electrode and associated lead, thereby insuring maximum simplicity of the color adapter tube construction. The nature of the parallax mask is dependent on the type of tricolor screen employed, the apertures of the parallax mask corresponding always in configuration and space distribution to one of the groups of elemental target areas exhibiting a particular color radiation response characteristic.

In the embodiment of Figure 1, the deflection-control system is shown as comprising a pair of coaxial cylindrical electrodes provided with mesh-covered complemental angular truncations. This arrangement is preferred for its simplicity of construction. However it is apparent that other types of deflection-control system may be employed, as for example a pair of simple deflection plates, for providing the desired transverse field component to effect color switching. Moreover, it may be desirable to provide a second deflection-control system (not shown) in space quadrature with electrodes 19 and 20 between those electrodes and the final accelerating electrode 21, in order to permit precision adjustment of the beam registration with each group of elemental target areas. Such an arrangement may be particularly advantageous in the event that fluorescent screen 16 is constructed as a pattern of dot triads. With a construction of this type, the second deflection-control system may be energized by color-switching device 28, or alternatively, may be provided with a simple bias adjustment for initial beam registration.

As a further modification, additional accelerating and/or decelerating electrodes may be provided for the purpose of more accurately maintaining collimation of the projected beam of space electrons.

Figure 2:
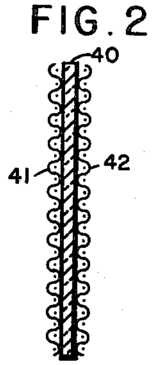
Figure 2 is a cross-sectional view illustrating a modification of a portion of the system of Figure 1.

In order to provide a more sharply defined beam cross-section, thereby minimizing color contamination, it may be desirable to form parallax mask 27 in the manner illustrated in Figure 2. In that figure, the parallax mask is shown as comprising a transparent base member 40 constructed of glass, plastic, or the like, provided on opposite surfaces with a pair of identical mask elements 41 and 42 arranged in precise transverse alignment. A mask of this type is effective in precluding undesired spreading of the light rays between their exit from the parallax mask and their points of impact on the photoemissive cathode 17. The end wall of color adapter tube 15 may be employed as base member 40, in which case photoemissive cathode 17 is deposited directly over mask element 42; alternatively, a separate member may be employed, the composite parallax mask being interposed between monochrome image-reproducing device 12 and color adapter tube 15 in the manner indicated in Figure 1.

Figure 3:
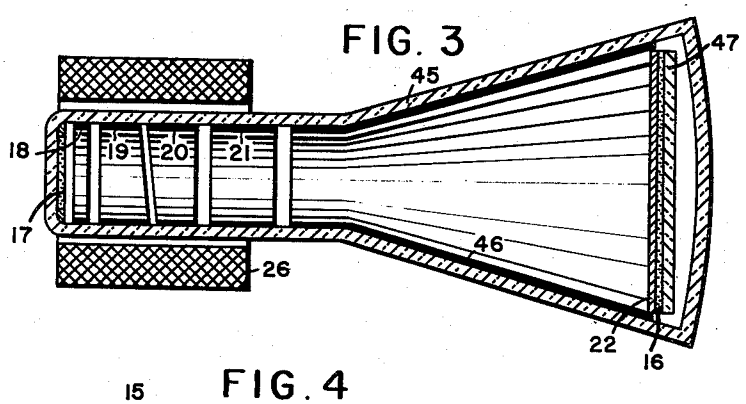
Figures 3 and 4 are cross-sectional views of other embodiments of the invention.

It is also possible in accordance with the invention to obtain image magnification in addition to color conversion. To this end, the color adapter tube may be constructed in the manner shown in Figure 3 in which the envelope 45 is provided with an outwardly flared portion between the photoemissive cathode 17 and the fluorescent screen 16. The flared portion of the envelope 45 is provided with an internal conductive coating 46 to insure field-free conditions for the space electrons as they approach fluorescent screen 16. The other electrodes 18, 19, 20 and 21 may also conveniently be formed as conductive coatings of suitable configuration on the inner wall of the neck portion of the envelope. When such a construction is employed, the mesh coverings for the angular truncations of deflection-control electrodes 19 and 20 may be omitted; while this arrangement results in a lens action between these two electrodes, the potential difference therebetween is maintained at such a low maximum value that no substantial detrimental effects are observed. Fluorescent screen 16 may be supported on a separate transparent base member 47 as indicated, or directly on the inner surface of the end wall of the envelope. Particularly in the event that a separate screen support is employed, it may be desirable to employ an envelope 45 of the metal-glass variety similar in nature to those used in the manufacture of some types of conventional cathode-ray tubes.

Figure 4:
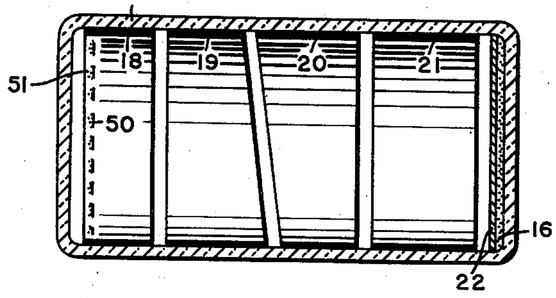

In all of the embodiments described thus far, a continuous photoemissive cathode is employed, and a parallax mask is interposed either between the monochrome image-reproducing device and the photoemissive cathode to dissect the black-and-white reproduction or between the continuous photoemissive cathode and the deflection-control system for intercepting a portion of the electron beam originating at the photoemissive cathode. In the embodiment of Figure 4, a different type of photoemissive cathode is employed in such a manner that no auxiliary parallax mask is required. In the embodiment of Figure 4, the continuous photoemissive cathode is replaced by one having a surface which corresponds in configuration and space distribution to the aggregate of all but one of the groups of elemental target areas of fluorescent screen 16. This may be conveniently accomplished as illustrated in Figure 4 by employing an opaque base member 50 constructed in the same manner as parallax mask 27 of the embodiment of Figure 1 and by depositing suitable photoemissive material 51 on the surface of base member 50 facing the screen of monochrome image-reproducing device 12. Photoelectrons originating at the sensitized surface 51 are drawn through the apertures in opaque base member 50 adjacent to the emitting area as a result of the fields established by the accelerating electrodes, with the result that, as before, an electron beam having a cross-section similar in configuration and space distribution to one of the groups of elemental target areas and space-modulated in intensity in accordance with the shade values of the black-and-white reproduction is projected toward fluorescent screen 16. Alternatively, the desired results may be attained by forming the photocathode on a conductive film applied to the inner surface of the glass end wall, with a configuration and space distribution corresponding to one of the groups of elemental target areas.

Thus the present invention provides a new and improved system and apparatus for the reproduction of transmitted images in natural color. An all-electronic arrangement is provided for converting black-and-white reproductions of different color content to corresponding primary color reproductions which are then integrated by the persistence of vision of the observer to produce the desired color image. No spinning color discs or rotating color drums are required, and the color adapter tube may be conveniently mounted on a pivotal support to permit ready withdrawal thereof during intervals when monochrome reception is desired. The color adapter tube is simple to construct and is not subject to the inherent size limitations associated with the mechanical color-converting arrangements of the prior art.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. A color adapter tube comprising: a fluorescent screen including a plurality of interspersed similar groups of similar elemental target areas, the elemental areas of each of said groups exhibiting a color-radiation response characteristic to electron bombardment which is different than that of each of the remainder of said groups; means including a photoemissive cathode for projecting toward said fluorescent screen an electron beam restricted in cross-sectional configuration and space distribution to correspond to one of said groups of elemental areas; and a deflection-control system intermediate said photoemissive cathode and said fluorescent screen and responsive to an applied color-control signal for causing transverse deflection of said electron beam from one to another of said groups of elemental areas.

2. A color adapter tube comprising: a fluorescent screen including a plurality of interspersed similar groups of similar elemental target areas, the elemental areas of each of said groups exhibiting a color-radiation response characteristic to electron bombardment which is different than that of each of the remainder of said groups; means including a photoemissive cathode and a mask provided with a plurality of apertures similar in configuration and space distribution to one of said groups of elemental areas for projecting towards said fluorescent screen an electron beam having a cross-section which corresponds to one of said groups of elemental areas; and a deflection-control system intermediate said photoemissive cathode and said fluorescent screen and responsive to an applied color-control signal for causing transverse deflection of said electron beam from one to another of said groups of elemental areas.

3. A color adapter tube comprising: a fluorescent screen including a plurality of interspersed similar groups of similar elemental target areas, the elemental areas of each of said groups exhibiting a color-radiation response characteristic to electron bombardment which is different than that of each of the remainder of said groups; means including a photoemissive cathode for projecting toward said fluorescent screen an electron beam restricted in cross-sectional configuration and space distribution to correspond to one of said groups of elemental areas; and a pair of coaxial complementally angularly truncated cylindrical deflection-control electrodes intermediate said photoemissive cathode and said fluorescent screen and responsive to an applied color-control signal for causing transverse deflection of said electron beam from one to another of said groups of elemental areas.

4. A color adapter tube comprising: a fluorescent screen including a plurality of interspersed similar groups of similar elemental target areas, the elemental areas of each of said groups exhibiting a color-radiation response characteristic to electron bombardment which is different than that of each of the remainder of said groups; means including a photoemissive cathode for projecting toward said fluorescent screen an electron beam restricted in cross-sectional configuration and space distribution to correspond to one of said groups of elemental areas; and a pair of coaxial cylindrical deflection-control electrodes having complemental angular mesh-covered truncations, said electrodes being disposed intermediate said photoemissive cathode and said fluorescent screen and responsive to an applied color-control signal for causing transverse deflection of said electron beam from one to another of said groups of elemental areas.

5. A color adapter tube comprising: a fluorescent screen including a plurality of interspersed similar groups of similar elemental target areas, the elemental areas of each of said groups exhibiting a color-radiation response characteristic to electron bombardment which is different than that of each of the remainder of said groups; means including a photoemissive cathode having a surface corresponding in configuration and space distribution to the aggregate of all but one of said groups of elemental areas for projecting an electron beam towards said fluorescent screen; and a deflection-control system intermediate said photoemissive cathode and said fluorescent screen and responsive to an applied color-control signal for causing transverse deflection of said electron beam from one to another of said groups of elemental areas.

6. A television receiver for utilizing composite color-video signals representing a transmitted color image and comprising video-signal, scansion-synchronizing, and color-synchronizing components, said receiver comprising: a monochrome image-reproducing device responsive to said composite color-video signals for producing black-and-white reproductions of different color content in repetitive color sequence at spaced intervals correlated with said color-synchronizing components; a color adapter tube in juxtaposition with said monochrome image-reproducing device and comprising a fluorescent screen including a plurality of interspersed similar groups of similar elemental target areas, the elemental areas of each of said groups exhibiting a different color-radiation response characteristic to electron bombardment than that of each of the remainder of said groups, means including a photoemissive cathode exposed to said black-and-white image reproductions for projecting toward said fluorescent screen an electron beam restricted in configuration and space distribution to correspond to one of said groups of elemental areas, and a deflection-control system for subjecting said electron beam to a transverse deflection field; and a color-switching device coupled to said deflection-control system and responsive to said color-synchronizing components for causing transverse deflection of said electron beam from one to another of said groups of elemental areas in synchronism with said sequential black-and-white reproductions.

7. A television receiver for utilizing composite color-video signals representing a transmitted color image and comprising video-signal, scansion-synchronizing, and color-synchronizing components, said receiver comprising: a monochrome image-reproducing device responsive to said composite color-video signals for producing black-and-white image reproductions of different color content in repetitive color sequence at spaced intervals correlated with said color-synchronizing components; a color adapter tube in juxtaposition with said monochrome image-reproducing device and comprising a fluorescent screen including a plurality of interspersed similar groups of similar elemental target areas, the elemental areas of each of said groups exhibiting a different color-radiation response characteristic to electron bombardment than that of each of the remainder of said groups, means including a continuous photoemissive cathode exposed to said black-and-white image reproductions for projecting an electron beam towards said fluorescent screen, a mask provided with a plurality of apertures similar in configuration and space distribution to one of said groups of elemental areas disposed between said monochrome image-reporducing device and said fluorescent screen for restricting the cross-section of said electron beam to correspond to one of said groups of elemental areas, and a deflection-control system disposed between said mask and photoemissive cathode on the one hand and said fluorescent screen on the other for subjecting said restricted electron beam to a transverse deflection field; and a color-switching device coupled to said deflection-control system and responsive to said color-synchronizing components for causing transverse deflection of said electron beam from one to another of said groups of elemental areas in synchronism with said sequential black-and-while reproductions.

8. A television receiver for utilizing composite color-video signals representing a transmitted color image and comprising video-signal, scansion-synchronizing, and color-synchronizing components, said receiver comprising: a monochrome image-reproducing device responsive to said composite color-video signals for producing black-and-white image reproductions of different color content in repetitive color sequence at spaced intervals correlated with said color-synchronizing components; a color adapter tube in juxtaposition with said monochrome image-reproducing device and comprising a fluorescent screen including a plurality of interspersed similar groups of similar elemental traget areas, the elemental areas of each of said groups exhibiting a different color-radiation response characteristic to electron bombardment than that of each of the remainder of said groups, means including a continuous photoemissive cathode exposed to said black-and-white image reproductions for projecting an electron beam towards said fluorescent screen, a mask provided with a plurality of apertures similar in configuration and space distribution to one of said groups of elemental areas disposed between said monochrome image-reproducing device and said photoemissive cathode for restricting the cross-section of said electron beam to correspond to one of said groups of elemental areas, and a deflection-control system disposed between said mask and photoemissive cathode on the one hand and said fluorescent screen on the other for subjecting said restricted electron beam to a transverse deflection field; and a color-switching device coupled to said deflection-control system and responsive to said color-synchronizing components for causing transverse deflection of said electron beam from one to another of said groups of elemental areas in synchronism with said sequential black-and-white reproductions.

9. A television receiver for utilizing composite color-video signals representing a transmitted color image and comprising video-signal, scansion-synchronizing, and color-synchronizing components, said receiver comprising: a monochrome image-reproducing device responsive to said composite color-video signals for producing black-and-white image reproductions of different color content in repetitive color sequence at spaced intervals correlated with said color-synchronizing components; a color adapter tube in juxtaposition with said monochrome image-reproducing device and comprising a fluorescent screen including a plurality of interspersed similar groups of similar elemental target areas, the elemental areas of each of said groups exhibiting a different color-radiation response characteristic to electron bombardment than that of each of the remainder of said groups, means including a photoemissive cathode exposed to said black-and-white image reproductions for projecting toward said fluorescent screen an electron beam restricted in configuration and space distribution to correspond to one of said groups of elemental areas, and a pair of coaxial cylindrical deflection-control electrodes having complemental angular truncations for subjecting said electron beam to a transverse deflection field; and a color-switching device coupled to said deflection-control electrodes and responsive to said color-synchronizing components for causing transverse deflection of said electron beam from one to another of said groups of elemental areas in synchronism with said sequential black-and-white reproductions.

10. In combination with an electron-discharge device for the reproduction of images in natural color, of the type comprising a multicolor fluorescent screen composed of a pluarlity of interspersed similar groups of similar elemental target areas, the elemental areas of each of said groups exhibiting a different color-radiation response characteristic to electron bombardment than that of each of the remainder of said groups, and a source of space electrons for exiting fluorescence of said screen: a mask having a plurality of apertures similar in configuration and space distribution to one of said groups of elemental areas for restricting excitation of said fluorescent screen at any instant of time to an aggregate area corresponding to one of said groups of elemental target areas; and an electrostatic deflection-control system comprising a pair of coaxial adjacent complementally angularly truncated cylindrical electrodes intermediate said mask and said fluorescent screen.

11. In combination with an electron-discharge device for the reproduction of images in natural color, of the type comprising a multicolor fluorescent screen composed of a plurality of interspersed similar groups of similar elemental target areas, the elemental areas of each of said groups exhibiting a different color-radiation response characteristic to electron bombardment than that of each of the remainder of said groups, and a source of space electrons for exiciting fluorescence of said screen; a pair of mask elements, each having a plurality of apertures similar in configuration and space distribution to one of said groups of elemental areas, juxtaposed in spaced accurate transverse alignment for restricting excitation of said fluorescent screen at any instant of time to an aggregate area corresponding to one of said groups of elemental target areas; and a deflection-control system intermediate said mask elements and said fluorescent screen.

12. In combination: a multicolor fluorescent screen composed of a plurality of interspersed similar groups of similar elemental target areas, the elemental areas of each of said groups exhibiting a different color-radiation response characteristic to electron bombardment than that of each of the remainder of said groups; means including a photoemissive cathode for projecting an electron beam toward said fluorescent screen; a mask, having a plurality of apertures similar in configuration and space distribution to one of said groups of elemental areas, supported adjacent said photoemissive cathode for restricting excitation of said fluorescent screen at any instant of time to an aggregate area corresponding to one of said groups of elemental target areas; and a deflection-control system intermediate said mask and said photoemissive cathode on the one hand and said fluorescent screen on the other.

13. In combination: a multicolor fluorescent screen composed of a plurality of interspersed similar groups of similar elemental target areas, the elemental areas of each of said groups exhibiting a different color-radiation response characteristic to electron bombardment than that of each of the remainder of said groups; means including a photoemissive cathode for projecting an electron beam toward said fluorescent screen; a mask, having a plurality of apertures similar in configuration and space distribution to one of said groups of elemental areas, supported adjacent said photoemissive cathode on the side thereof remote from said fluorescent screen for restricting illumination of said photoemissive cathode to an aggregate area corresponding to one of said groups of elemental target areas; and a deflection-control system intermediate said photoemissive cathode and said fluorescent screen.

14. In combination: a multicolor fluorescent screen composed of a plurality of interspersed similar groups of similar elemental target areas, the elemental areas of each of said groups exhibiting a different color-radiation response characteristic to electron bombardment than that of each of the remainder of said groups; means including a photoemissive cathode for projecting an electron beam toward said fluorescent screen; a pair of mask elements, each having a plurality of apertures similar in configuration and space distribution to one of said groups of elemental areas, supported on opposite surfaces of a transparent base member in accurate transverse alignment adjacent said photoemissive cathode on the side thereof remote from said fluorescent screen for restricting illumination of said photoemissive cathode to an aggregate area corresponding to one of said groups of elemental target areas; and a deflection-control system intermediate said photoemissive cathode and said fluorescent screen.

References Cited in the file of this patent

UNITED STATES PATENTS

| | | |
|---|---|---|
| 2,206,387 | Bruche | July 2, 1940 |
| 2,518,200 | Sziklai et al. | Aug. 8, 1950 |
| 2,532,511 | Okolicsanyi | Dec. 5, 1950 |
| 2,564,737 | Szegho | Aug. 21, 1951 |
| 2,573,777 | Sziklai | Nov. 6, 1951 |
| 2,634,327 | Sziklai | Apr. 7, 1953 |
| 2,653,993 | Schroeder et al. | Sept. 29, 1953 |

FOREIGN PATENTS

| | | |
|---|---|---|
| 964,594 | France | Aug. 18, 1950 |